United States Patent [19]

Naito

[11] Patent Number: 5,125,028
[45] Date of Patent: Jun. 23, 1992

[54] TELEVISION SIGNAL SCRAMBLING METHOD AND APPARATUS

[75] Inventor: Akihiko Naito, Tokyo, Japan

[73] Assignee: Pioneer Electronic Corporation, Tokyo, Japan

[21] Appl. No.: 604,851

[22] Filed: Oct. 29, 1990

[30] Foreign Application Priority Data

Mar. 22, 1990 [JP] Japan .................................. 2-69658

[51] Int. Cl.⁵ .......................................... H04N 7/167
[52] U.S. Cl. ...................................... 380/20; 380/15; 380/7; 380/43
[58] Field of Search .................. 380/7, 8, 15, 19, 20, 380/21, 43, 48

[56] References Cited

U.S. PATENT DOCUMENTS

| | | | |
|---|---|---|---|
| 2,567,539 | 9/1951 | Aram | 380/20 X |
| 4,466,017 | 8/1984 | Banker | 380/20 X |
| 4,771,455 | 9/1988 | Hareyama et al. | 380/48 X |
| 4,794,643 | 12/1988 | Saeki et al. | 380/20 X |
| 4,953,208 | 8/1990 | Ideno | 380/19 |

FOREIGN PATENT DOCUMENTS

2231755 11/1990 United Kingdom .
2232032 11/1990 United Kingdom .

*Primary Examiner*—Tod Swann
*Attorney, Agent, or Firm*—Sughrue, Mion, Zinn, Macpeak & Seas

[57] ABSTRACT

A television scrambling system of the GSS type includes a false key signal to defeat pirate decoders. The false key is placed approximately one half a horizontal line period following the last horizontal sync pulse preceding the vertical blanking interval of the television signal. If the pirate decoder is set to attenuate the video portion of the picture signal in response to receipt of a standard GSS scrambled signal, the pirate decoders will attenuate only the sync portion of the picture signal in response to a signal scrambled with the false key.

16 Claims, 7 Drawing Sheets

FIG. 7(a) PRIOR ART  IFv

FIG. 7(b) PRIOR ART  IFv

FIG. 7(c) PRIOR ART  IFa

TELEVISION SIGNAL SCRAMBLING METHOD AND APPARATUS

BACKGROUND OF THE INVENTION

1. Industrial Field of the Invention

The present invention relates to a television signal scrambling method and apparatus for a CATV system, where many terminals are connected to a center through cables, and picture signals being sent from the center to the terminals.

2. Related Art

Generally, in a CATV system, programs produced in the center and those received over the air are sent to the terminals through the cables. Some programs produced at the center are provided to the terminals for a fee. When such so-called "charged programs" are watched by a subscriber at the subscriber's terminal, a predetermined fare is charged to the subscriber.

To prevent subscribers from illegally viewing the charged programs without paying any fee, the pictures are scrambled at the center ("head end") so that conventional television sets cannot correctly receive the picture signals of the charged programs.

On the other hand, for the subscribers who are authorized to view the charged programs, a descrambling apparatus for restoring the scrambled picture signals is installed.

Various types of the scrambling and descrambling methods have been used or suggested. One method currently in use is the so-called GSS (Gated Sync. Suppression) method. According to this method, the horizontal and vertical synchronizing signal portions of a television signal are compressed by several dB such that the conventional television set receiving such a signal cannot synchronize horizontally and vertically. However, at subscriber's terminals the horizontal and vertical synchronizing signal portions of the television signal are expanded to their former levels so as to restore the original television signal.

Figure 7A:
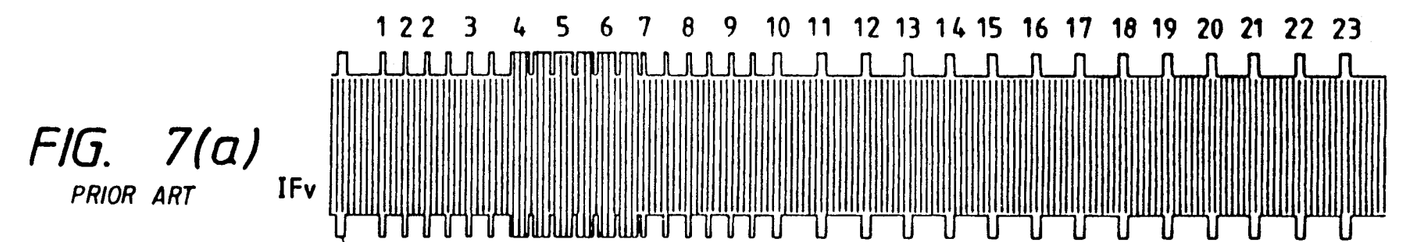
Figure 7B:
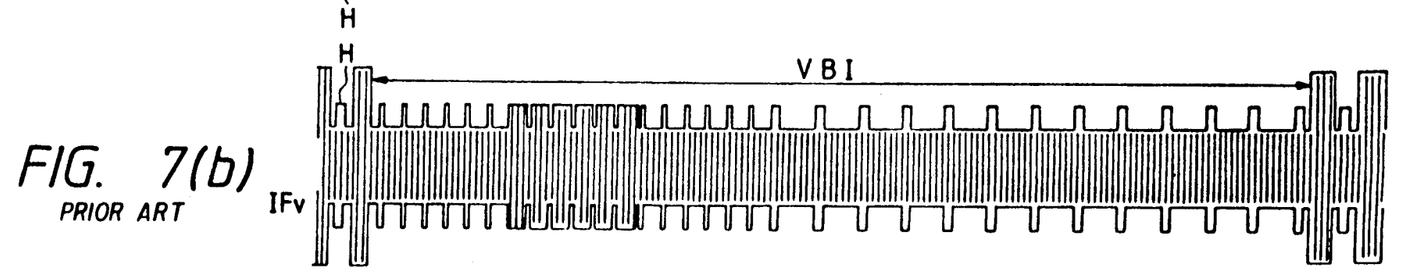
Figure 7C:
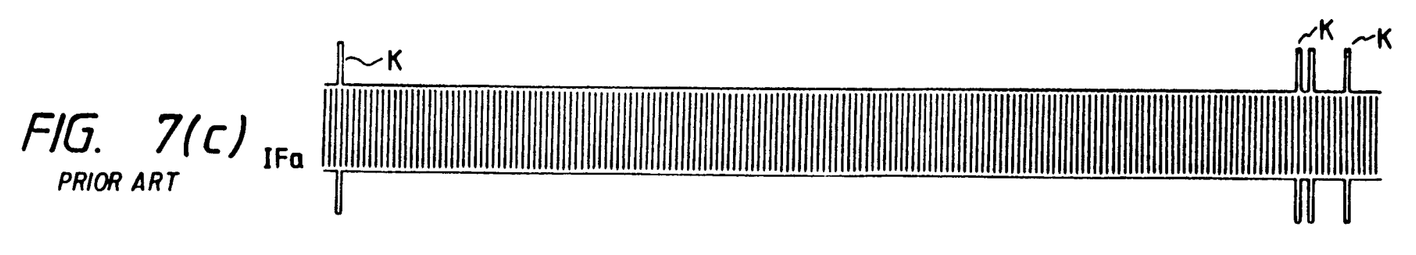

FIGS. 7(a)-7(c) illustrate the result of a scrambling operation using the GSS method. The Figures show signal wave forms of the VBI portion of a television signal following the last portion of horizontal synchronization, H.

FIG. 7(a) illustrates a portion of a conventional television signal which has been converted into an intermediate frequency picture signal, IFv. As shown in FIG. 7(b), at the transmission side, that is, at the center, the horizontal synchronizing signal (H) and the vertical blanking interval (VBI) in the intermediate frequency television signal IFv are compressed a particular amount, for example, approximately 6 dB or 10 dB. As shown in FIG. 7(c), a key signal, representing a compression timing of the horizontal synchronizing signal, is superimposed on an intermediate frequency FM audio signal IFa at the center. The resultant signal IFa and the intermediate frequency television signal IFv are up converted to an RF signal and sent via the cables to the terminals.

At each terminal having a descrambler, the intermediate frequency audio signal IFa is extracted from the received RF signal, and the key signal K is detected from the intermediate frequency audio signal IFa. The timing of the detected key signal K is used to restore the horizontal synchronizing signal portion of the television signal by expanding the same by approximately 6 dB or 10 dB. In addition, the absence of the key signal is detected and the VBI portion is expanded for approximately 6 dB or 10 dB so as to restore the received signal to the former television signal.

When television signals are scrambled according to the aforementioned scrambling method, non-authorized subscribers can descramble them relatively easily, thereby illegally viewing the charged programs.

For example, at each horizontal blanking interval (HBI), the key signal is AM modulated and then superposed on the audio signal. If one detects the key signal, which is accomplished with an AM detector, and passes the detected key signal to an integration circuit or the like, the synchronizing signal of the VBI portion can be identified. Subsequently, by operating a free running timing generator in synchronization with the synchronizing signal, the amplitude of a pulse that the free running timing generator generates is adjusted in accordance with the integration level of the synchronizing signal so as to descramble the received signal.

SUMMARY OF INVENTION

An object of the present invention is to solve the above problems and to provide a television signal scrambling method and apparatus which prevents unauthorized terminals from easily receiving the charged programs.

To solve the aforementioned problems, the television signal scrambling method, according to the present invention, comprises the following steps.

(1) Compressing the horizontal synchronizing, the equalization and the vertical synchronization pulses, to a particular level, in the first half of the VBI.

(2) Superimposing on an audio signal, a key signal which includes information relating to the compression of the horizontal synchronizing pulses.

(3) Intermittently superimposing a false key signal on the audio signal for approximately ½ the horizontal scanning time period, after the last horizontal synchronizing section.

The television signal scrambling apparatus comprises a horizontal synchronization detector for detecting the position of the horizontal synchronizing signals of a television signal, a vertical synchronization detector for detecting the position of the vertical synchronizing signal of the television signal, a first control signal generator for generating control signals according to 1 horizontal scanning time period and ½ horizontal scanning time period of the television signal by using the horizontal synchronization detector, a second control signal generator for generating a control signal according to the equalizing pulse section including the vertical synchronization pulses in the first half of a vertical blanking interval in accordance with a signal detected and output by the vertical synchronization detector, video AM modulation means for inputting the television signal and for AM modulating the television signal, audio AM modulation means for inputting an audio signal and for AM modulating the audio signal, video AM modulation control signal generating means for receiving the control signals from the first control signal generator and the second control signal generator and for generating a control signal to the video AM modulation means, the control signal compressing to a particular level the horizontal synchronization section of the television signal and the equalizing pulse section including a vertical synchronization in the first half of a vertical blinking interval which follows the horizontal synchronization section, and audio AM modulation control signal generator for receiving the control signals from the first control signal generator and the second control signal generator, for superimposing a key signal on the horizontal synchronization section of the television signal and a horizontal scanning timing position in the last half of the vertical blanking interval by using the audio AM modulation means, and for generating a control signal so as to intermittently superimpose a false key signal at a position approximately ½ horizontal scanning time after the last horizontal sync pulse of the horizontal synchronization section which precedes the vertical blanking interval.

As described above, since the false key signal is intermittently superimposed on the audio signal at a position approximately ½ the horizontal scanning time period after the last horizontal sync pulse of the horizontal synchronization portion preceding the vertical blanking interval, at the terminal the time of occurrence of the expanded pulse deviates or does not deviate for approximately ½ the horizontal scanning time period at intervals of one frame or at random, for example.

In addition, since only the VBI is compressed and it is compressed as the horizontal synchronizing signal from horizontal synchronization 10H as the horizontal synchronizing signal, it is very difficult to detect the horizontal synchronization.

Thus, at the terminal, it is impossible to satisfactorily expand the horizontal synchronization section, thereby preventing the non-authorized terminal from illegally receiving the charged programs.

BRIEF DESCRIPTION OF THE DRAWINGS

FIGS. 2(a-c, x and z) and 3(a and y) are waveform diagrams of signals occurring in the apparatus of FIG. 1;

FIG. 6(a-c) is a waveform diagram illustrating the operation of the illegal descrambling apparatus of FIG. 5 when a television signal scrambled according to the present invention is input to the illegal descrambling apparatus; and FIG. 7(a-c) is a waveform diagram illustrating a conventional scrambling method.

DETAILED DESCRIPTION OF A PREFERRED EMBODIMENT

Figure 1:
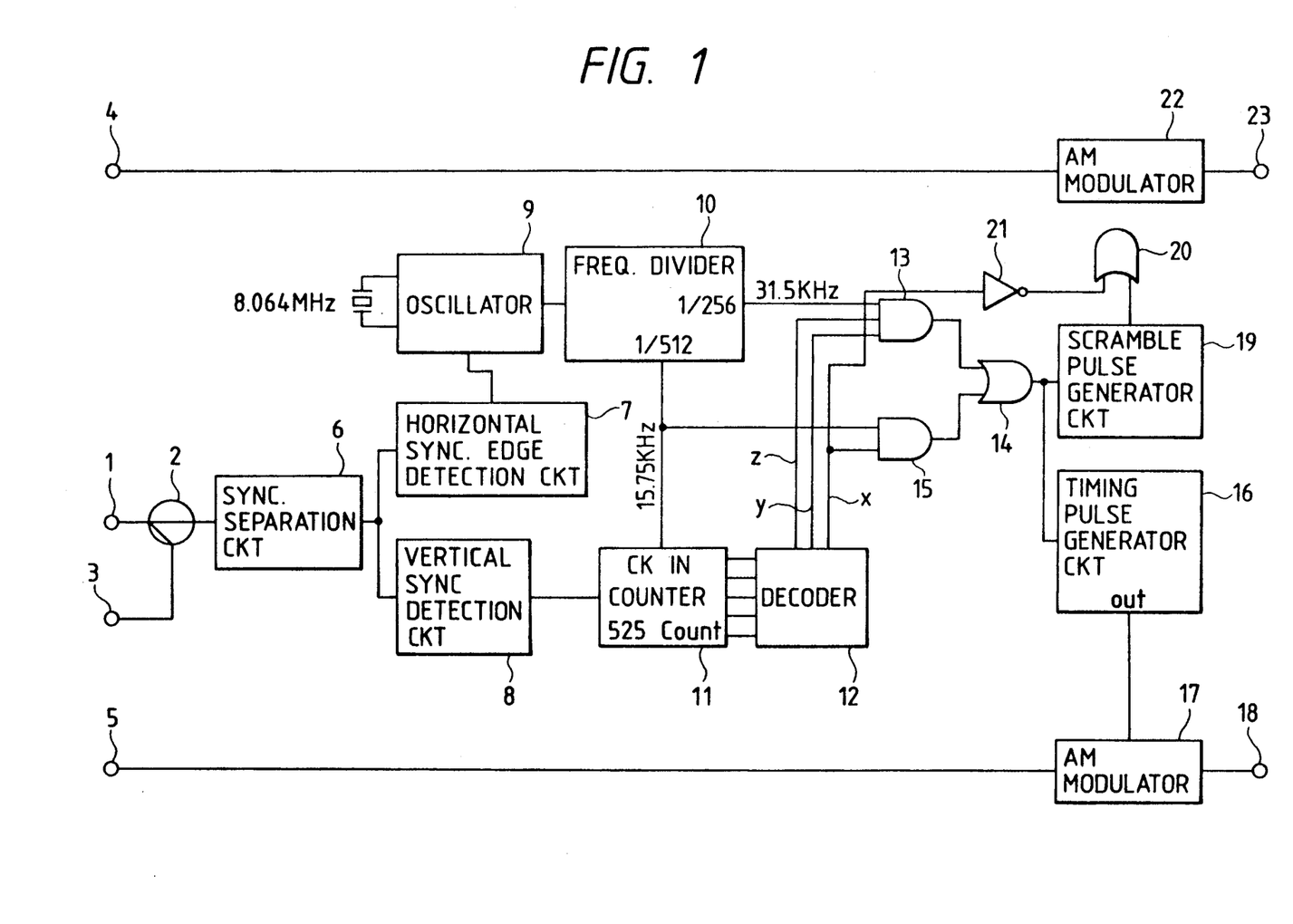
FIG. 1 is a block diagram showing a scrambling apparatus embodying a television signal scrambling method according to the present invention.

FIG. 1 is a block diagram of an embodiment of a scrambling apparatus according to the present invention. In the figure, numeral 1 is an input terminal to which is applied a base band television signal. The television signal at input terminal 1 is branched by a branch member 2 and then sent to an output terminal 3. The television signal which is sent to the output terminal 3 is split into an audio and a picture signal by means not shown. The picture signal is converted into an intermediate frequency signal and then sent to an intermediate frequency picture signal input terminal 4. The audio signal is converted into an intermediate frequency audio signal and then sent to an input terminal 5.

The base band television signal at input terminal 1 is also sent to a synchronization separation circuit 6, which extracts the synchronizing signals and sends the extracted signals to be sent to a horizontal synchronization edge detection circuit 7 and a vertical synchronization detection circuit 8. The horizontal synchronization edge detection circuit 7 detects an edge output signal of the horizontal synchronizing signal at a frequency of 15.75 kHz. The edge signal synchronizes an oscillator 9, which oscillates at 8.064 MHz by means of a crystal device. Thus, the 8.064 MHz signal generated by the oscillator 9 is phase-synchronized with the horizontal synchronizing signal. The signal from the oscillator 9 is sent to a frequency divider 10. The frequency divider 10 divides the frequency of the signal by 512 and 256 and creates a 1/512 frequency signal and a 1/256 frequency signal, respectively.

The 1/512 frequency signal, namely the 15.75 KHz signal, is sent to a clock input terminal of a counter 11. The counter 11 is a 525-line counter. The counter 11 is reset by a signal from the vertical synchronization detection circuit 8. Thus, the counter 11 counts up the 15.75 KHz signal in synchronization with the vertical synchronizing signal. A decoder 12 is connected to the counter 11. The decoder 12 generates three types of timing signals in accordance with signals which are output from the counter 11.

As shown in FIG. 2, waveform x, a first timing signal goes low (L) during the VSI in the first half of the VBI and goes high (H) during the remainder of the VBI. The VSI is the vertical synchronizing interval, which includes in sequence, the equalizing pulses followed by the vertical synchronizing pulses, followed by more equalizing pulses. The VBI is the vertical blanking interval and includes the VSI plus a following group of horizontal line intervals. As shown in FIG. 3, waveform (y), a second timing signal is a rectangular wave wherein the signal state changes between "H" and "L" at intervals of one field; namely one cycle of this timing signal corresponds to one frame of the TV signal. As shown in FIG. 2 waveform (z), a third timing signal goes high during the single horizontal scanning interval preceding the VBI section. These timing signals are provided on the lines x, y and z, respectively out of the divider 12.

The timing signals x, y and z, along with the 15 KHz and 31.5 KHz frequencies (twice the horizontal scanning frequency) are applied as inputs to a logic circuit consisting of AND gates 13 and 15 and OR gate 14 to produce the pulse waveform shown as waveform C in FIG. 2. This waveform consists of key pulses or signals at positions corresponding to the horizontal sync pulses everywhere, except during the VSI, plus a single false key pulse, FK, which occurs once per frame at the midpoint of the last horizontal scan line preceding the VSI. The false key is obtained by ANDing timing signals y and z with the 31.5 KHz output from frequency divider 10. Note that the signal z and the signal y will both be high once per frame during the last horizontal scan time preceding a VSI. These "H" levels will cause AND 13 to pass therethrough a pulse from the frequency divider 10, as shown as FK in FIG. 2.

The AND gate 15 will pass through the 15.75 KHz (horizontal scan rate) pulses at all times except when blocked by timing signal x being low. Since timing signal x is low during each VSI, there will be no key pulses passing out of AND gate 15 and through OR gate 14 during the VBI.

Figure 4A:
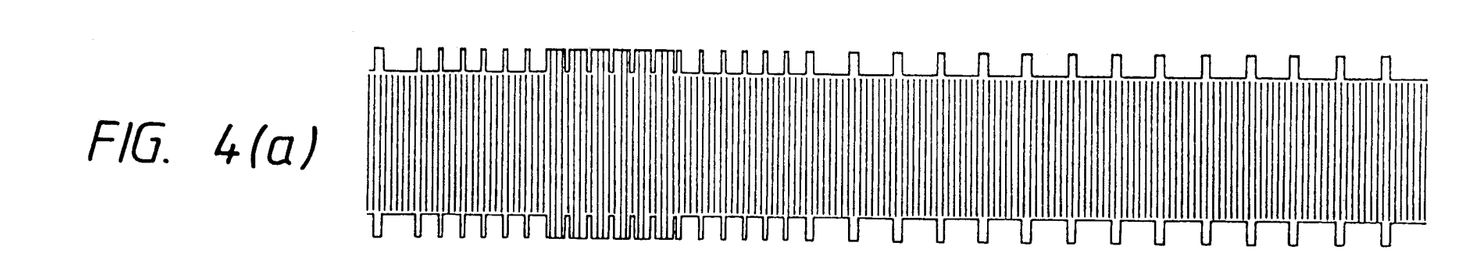
FIGS. 4(a)-4(c) are waveform diagrams describing a scrambling method according to the present invention.

The signal c is sent to a trigger input terminal of a timing pulse generator circuit 16. The resultant signal from the timing pulse generator circuit 16 is sent to an AM modulator 17 as a modulation signal, the AM modulator 17 AM modulates the audio intermediate frequency signal. Consequently, a signal shown in FIG. 4(c) is output form an output terminal 18 of the AM modulator 17. K of the signal c is a key signal which represents the position of the horizontal synchronization, FK is the aforementioned false key signal.

A signal from the OR circuit 14 is sent to a trigger input terminal of a scramble pulse generator circuit 19. When the trigger signal is input, the scramble pulse generator circuit 19 generates a pulse with a particular time duration, for example, 12 usec. The pulse from the scramble pulse generator circuit 19 is sent to an OR circuit 20. The first timing signal x is output from the decoder 12 and then inverted by a invertor 21. The inverted signal is sent to the OR circuit 20. Consequently, the OR circuit 20 generates a signal which goes high during the VSI period and during 12 usec intervals including each horizontal synchronizing pulse.

The resultant signal from the OR circuit 20 is sent to an AM modulator 22. The intermediate frequency television signal is compressed, for example by 6 or 10 dB, during the VSI and during the horizontal blanking interval. Thus, the television signal (FIG. 4(a)) which is sent to the input terminal 4 is scrambled as shown in FIG. 4(b) and then output from the output terminal 23.

Figures 2A, 2B:
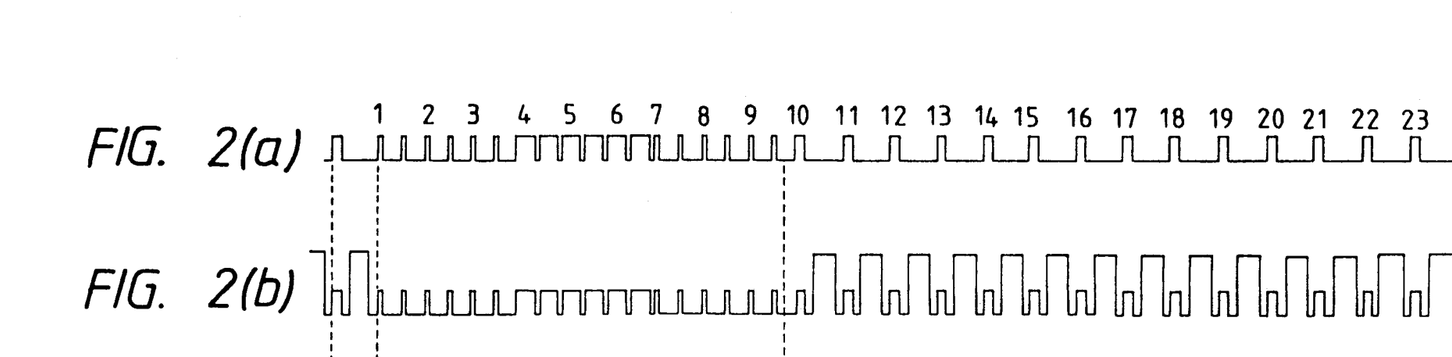
Figure 2C:
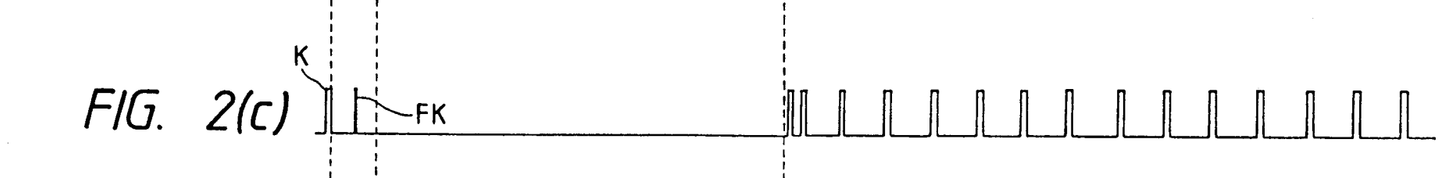
Figure 2X:
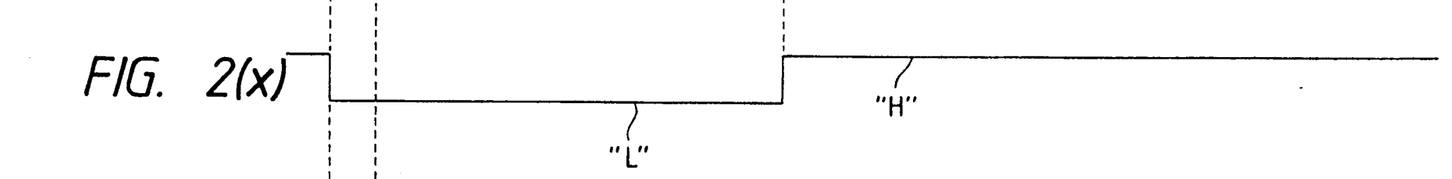
Figure 2Z:
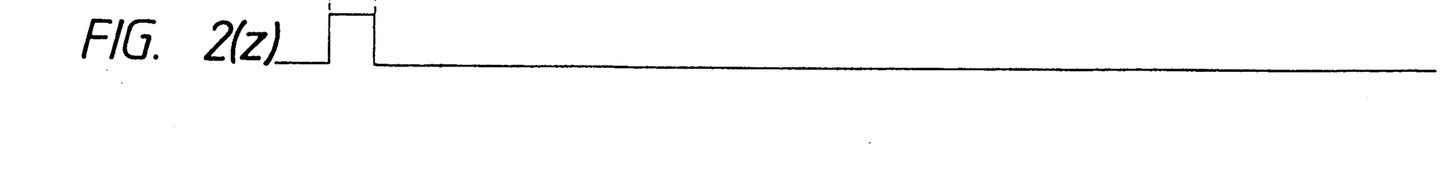
Figures 3A, 3Y:
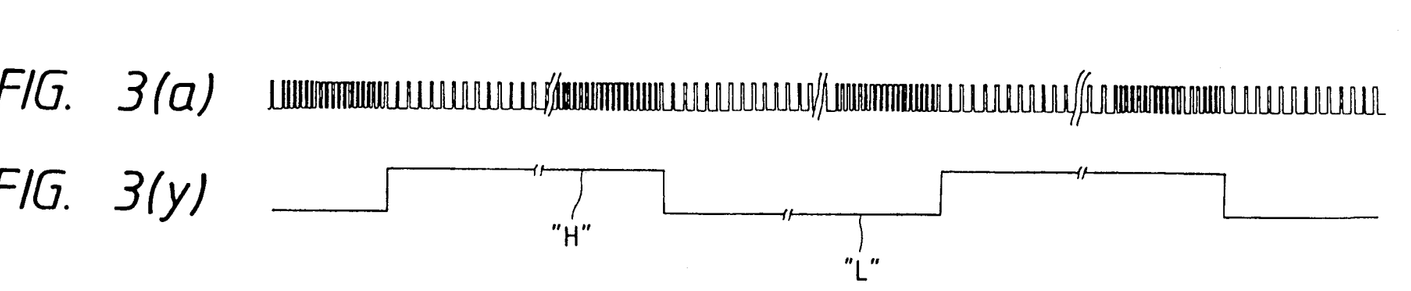

FIGS. 2(a) and 3(a) illustrate on different time scales a wave form of the normal base band television signal. FIG. 2(b) shows a waveform of the scrambled television signal. These signals are illustrated so that the operating timings of the signals c, x, y, and z of FIGS. 2 and 3 can be easily understood.

Figure 4B:
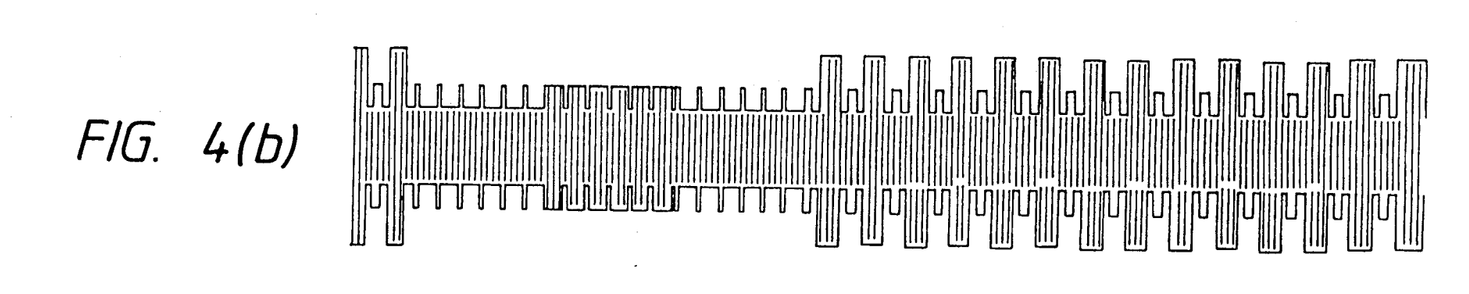
Figure 4C:
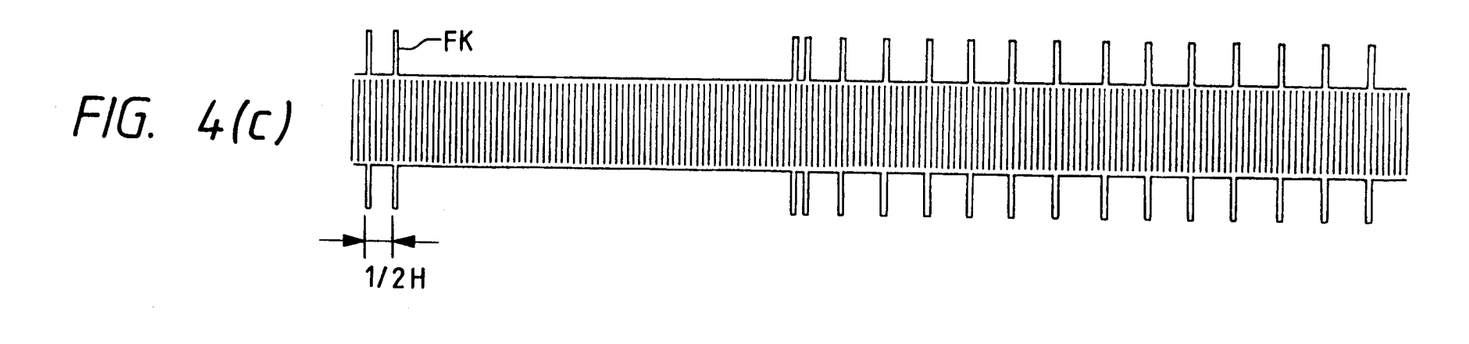

The television signal scrambled in the aforementioned manner (FIG. 4(b)) and the audio signal (FIG. 4(c)), where the key signal K and the false key signal FK are superimposed, are converted into an RF signal by an RF converter (not shown in the figures) and then sent to terminals through cables in a manner which is well known in the art.

Figure 5:
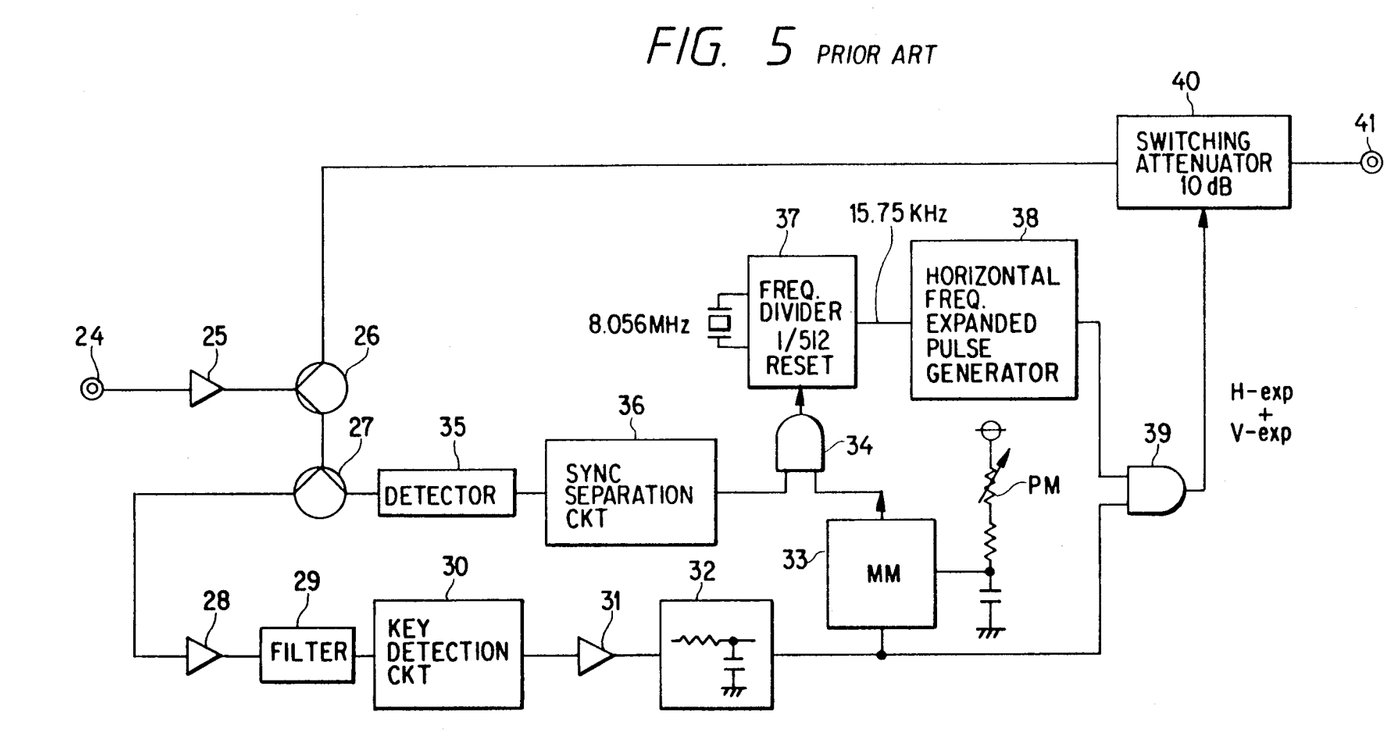
FIG. 5 is a block diagram of a conventional illegal descrambling apparatus.

FIG. 5 is a diagram of an illegal descrambling apparatus currently used by some non-subscribers to descramble the TV signals scrambled in accordance with the prior art method described above.

Numeral 24 is an input terminal. The scrambled television signal shown in FIG. 4(b) and the audio modulation signal shown in FIG. 4(c) are input to the input terminal 24. The signals being input to the input terminal 24 are amplified by a buffer amplifier 25 and then branched by a branch member 26. One of the branched signals is sent to a second branch member 27. Part of the signal branched by the second branch member 27 is sent to a filter 29 through a buffer amplifier 28 so as to extract the audio modulation signal.

The audio modulation signal is sent to a key detection circuit 30. The key detection circuit 30 detects the key signal. The key signal is amplified by a buffer amplifier 31 and then sent to an integration circuit 32. Depending on whether the key signal K is present or absent, the integration circuit 32 causes the output signal to go "H" or "L", respectively. In other words, during the VSI in the first half of the VBI, where the key signal K is absent, the signal which is output from the integration circuit 32 goes "L".

The resultant signal from the integration circuit 32 is sent to a trigger terminal of a one-shot multivibrator (MM) 33, the resultant signal being triggered by the MM 33 when the signal goes "L". Thus, the MM 33 is triggered shortly after the last key signal K or after the false key signal FK preceding the VBI. The MM 33 generates a window signal shown in FIG. 6(c) and (e). By adjusting a potentiometer PM, the window signal is coincident with the VSI portion of the picture signal. The window signal is sent to one of input terminals of an AND circuit 34.

Figure 6A:
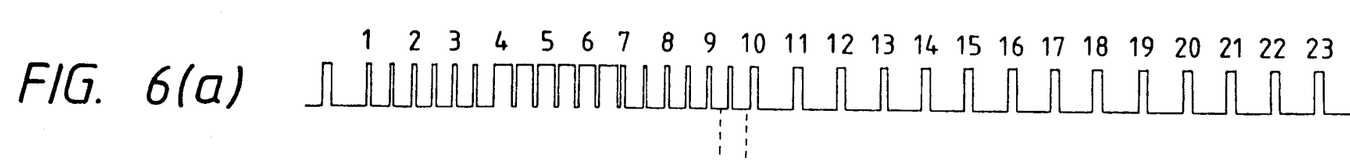
Figures 6B, 6C:
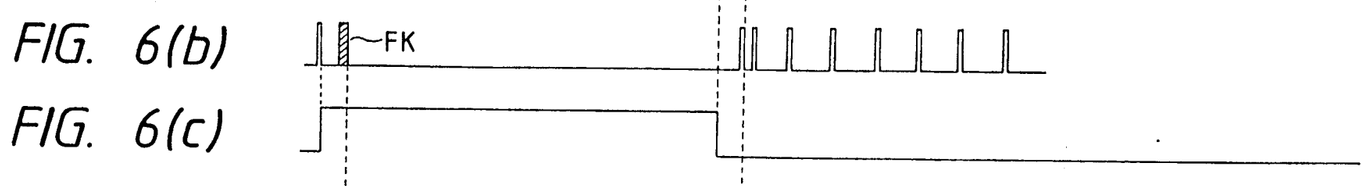

The television signal which is input through the second branch member 27 is detected by a detector 35 and then synchronously separated by a synchronization separation circuit 36. The synchronizing signal which is synchronously separated is sent to the other input terminal of the AND circuit 34. Thus, a signal shown in FIG. 6(d) or (f) is generated at the output terminal of the AND circuit 34. In other words, the signal shown in FIG. 6(a) is the television signal in the base band. When the window signal is as shown in FIG. 6(c), the signal d is output. When the window signal is as shown in FIG. 6(e), the signal f is output.

The resultant signal from the AND circuit 34 is sent to the reset terminal of a frequency divider 37 for dividing the 8.056 MHz signal from the crystal oscillator by 512. Thus, the resultant 15.75 kHz signal from the frequency divider 37 is locked by the equalizing pulse which is last output from the AND circuit 34.

The resultant signal from the frequency divider 37 is sent to a horizontal synchronizing expansion pulse generator 38. The resultant signal from the horizontal synchronizing extension pulse generator 38 is sent to one of input terminals of an AND circuit 39. The resultant signal from the integration circuit 32 is sent to the other terminal of the AND circuit 39. The resultant signal from the integration circuit 32 functions as a window control signal. The resultant signal from the AND circuit 39 serves to control the attenuation of an attenuator 40. The attenuator 40 intermittently attenuates the scrambled television signal (FIG. 4(b)) which is input from the branch member 26 and then outputs the resultant signal to an output terminal 41.

In other words, in the equalizing pulse section including the vertical synchronization in the first half of the VBI, the output signal from the integration circuit 32 goes "L". Thus, the AND condition of the AND circuit 39 is not satisfied and thereby the output signal goes "L". At that time, the attenuator 40 does not execute the attenuating operation. Consequently, the television signal is output as it is in the equalizing pulse section in the first half of the VBI.

However, during other than such a section, the window signal is sent from the integration circuit 32 to the AND circuit 39. The 15.75 KHz signal, which synchronizes with the equalizing pulse and which is sent from the extension pulse generator 38, is sent to the attenuator 40.

Figure 6D:
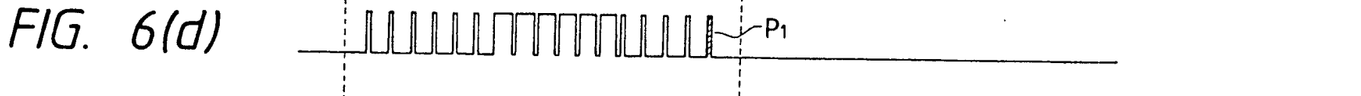
Figure 6E:
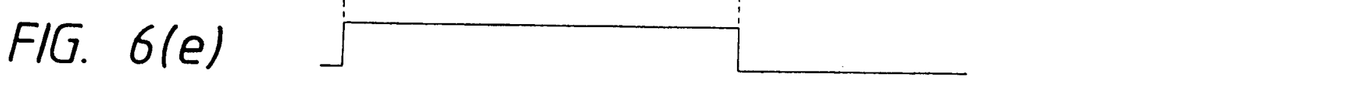

When the false key signal is absent, the reset signal shown in FIG. 6(d) is generated. The output signal from the frequency divider 37 is locked to the last pulse P1 as shown in FIG. 6(d). Thus, the attenuator 40 compresses the television signal excluding the portion of the horizontal synchronization by approximately 10 dB.

Figure 6F:
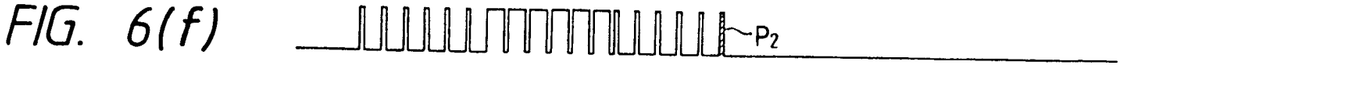

On the other hand, when the false key signal FK is present, the reset signal shown in FIG. 6(f) is generated. The output signal from the frequency divider 37 is locked to the last pulse P2 shown in FIG. 6(f). Thus, the attenuator 40 compresses the television signal excluding the intermediate section between the horizontal synchronizing signal and the subsequent horizontal synchronizing signal, namely the picture signal section.

Thus, when the false key signal FK is absent, the equalizing pulse section including the vertical synchronization and the horizontal synchronization section are relatively extended so as to descramble the television signal.

However, since the false key signal FK is generated at intervals of one frame or at random intervals, the television signal cannot be generally descrambled.

In the field following the field shown in FIG. 6, the equalizing pulse advances for ½ horizontal scanning time period.

In this case, the phases of the lock pulses P1 and P2 advance for ½ horizontal scanning time period. Thus, when the false key signal FK is absent, the descrambling operation is executed. When the false key signal FK is present, the descramble operation is not executed. Thus, like the aforementioned case, it is generally impossible to descramble the television signal.

On the other hand, in the authorized descrambling apparatus, the compression position and the timing of the key signal are known in advance. Thus, even if the television signal is scrambled in the aforementioned manner, it can be correctly descrambled and thereby no problem takes place.

In the aforementioned embodiment, the false key signal was placed at the position according to ½ horizontal scanning time period. However, the false key can be placed at any position close to ½ horizontal scanning time period.

What is claimed is:

1. A method for scrambling a television signal of the type having a picture portion and an audio portion, said picture portion including video signals and synchronization signals, said synchronization signals including horizontal sync pulses at a horizontal sync frequency and a vertical blanking interval comprising a vertical synchronizing interval followed by several horizontal sync pulses and no video signals, said vertical synchronizing interval comprising equalizing pulses followed by vertical sync pulses followed by more equalizing pulses; said method comprising the steps of:
    (a) compressing only the vertical synchronizing interval of said vertical blanking interval and compressing a small region encompassing each horizontal sync pulse of said picture portion of said TV signal to a level to render said synchronization signals undetectable by an ordinary television receiver;
    (b) generating a key signal having timing pulses corresponding respectively to the timing of the horizontal sync pulses in said picture signal, including those horizontal sync pulses in said vertical blanking interval;
    (c) generating a false key signal corresponding respectively to a time approximately one half a horizontal line period after the last horizontal sync pulse preceding the vertical synchronizing interval;
    (d) superimposing said key signal from step (b) and said false key signal from step (c) on said audio in such a way that said key signal from step (b) and said false key signal from step (c) coincide with a part of said picture portion which is outside of said vertical blanking interval; and
    (e) transmitting said picture signal with said compressed portions and said audio with said superimposed key signal and false key signal as a scrambled television signal.

2. A method according to claim 1 wherein said false key signal is generated once per frame.

3. A method according to claim 1 wherein said false key signal is generated once per field.

4. A method according to claim 1 wherein said false key signal is generated in random fields of said television signal.

5. A method according to claim 1 wherein the step of compressing comprises:
    (a) separating from said picture signal said synchronization signals and further separating said synchronization signals into horizontal and vertical synchronization signals, respectively;
    (b) detecting an edge of each of said separated horizontal synchronization signals,
    (c) using said horizontal synchronization edge detections to synchronize an oscillator having an output frequency equal to a multiple of a television sync horizontal scanning frequency;
    (d) dividing the output of said oscillator into a first frequency signal at twice the horizontal line frequency and a second frequency signal equal to the horizontal line frequency;
    (e) detecting an edge of said separated vertical synchronization interval,
    (f) using said vertical synchronization interval detected edge to reset a counter which counts the said second frequency signal, whereby the count of said counter represents the counts at a horizontal line rate within each field of said television signal;
    (g) developing from the count in said counter a first timing signal which is active at all times of said television signal, except during said vertical synchronization interval;
    (h) developing from the count in said counter a second timing signal which is active every other field of said television signal;
    (i) developing from the count in said counter a third timing signal which is active only during the last horizontal scanning interval preceding the vertical blanking interval of said television signal;
    (j) logically combining said three timing signals and said first and second frequency signals to develop a compression signal comprising the vertical synchronizing interval and a small region encompassing each horizontal sync pulse of said picture portion of said television signal.

6. A method as claimed in claim 5 wherein the steps of generating said key signal and said false key signal comprises;
    (a) logically ANDing said second and third timing signals with said first frequency signal to produce a pulse output occurring once per frame at a location approximately one half the horizontal line period following the last horizontal sync pulse preceding the vertical blanking interval; and
    (b) logically ANDing said first timing signal and said second frequency signal to produce a pulse output occurring in substantial coincidence with every horizontal sync pulse of said television signal.

7. In a scrambling method for a television signal of the type using GSS scrambling to compress sync signals and place corresponding key signals on the audio portion of the television signal, the improvement comprising, periodically generating a false key signal and superimposing it on said audio in a position trailing by approximately a half horizontal time period the key signal which corresponds to the last horizontal sync signal preceding the vertical blanking interval, in such a way that said key signal and said false key signal coincide with a part of said picture portion which is outside of said vertical blanking interval.

8. Apparatus for scrambling a television signal of the type having a picture portion and an audio portion, said picture portion including video signals and synchronization signals, said synchronization signals including horizontal sync pulses at a horizontal sync frequency and a vertical blanking interval comprising a vertical synchronizing interval followed by several horizontal sync pulses and no video signals, said video synchronizing interval comprising equalizing pulse followed by vertical sync pulses followed by more equalizing pulses, said apparatus comprising:
 (a) means for compressing only the vertical synchronizing interval of said vertical blanking interval and compressing a small region encompassing each horizontal sync pulse of said picture portion of said TV signal to a level to render said synchronization signal undetectable by an ordinary television receiver;
 (b) means for generating a key signal having timing pulses corresponding respectively to the timing of every horizontal sync pulse in said picture signal, including those horizontal sync pulses in said vertical blanking interval;
 (c) means for generating a false key signal corresponding to a time approximately one half a horizontal line period after the last horizontal sync pulse preceding the vertical synchronizing interval;
 (d) means for superimposing said key signal generated by said means for generating a key signal and said false key signal on said audio in such a way that said key signal and said false key signal coincide with a part of said picture portion which is outside of said vertical blanking interval; and
 (e) means for transmitting said picture signal with said compressed portions and said audio with said superimposed key and false key signals as a scrambled television signal.

9. Apparatus according to claim 8 wherein said means for generating said false key signal generates said false key signal once per frame.

10. Apparatus according to claim 8 wherein said means for generating said false key signal generates said false key signal once per field.

11. Apparatus according to claim 8 wherein said means for generating said false key signal generates said false key signal in random fields of said television signal.

12. Apparatus according to claim 8 wherein said means for compressing comprises,
 (a) means for separating from said picture signal said synchronization signals and for further separating said synchronization signals into horizontal and vertical synchronization signals, respectively,
 (b) means for detecting an edge of each of said separated horizontal synchronization signals to provide edge detections,
 (c) an oscillator having an output frequency equal to a multiple of a television sync horizontal scanning frequency,
 (d) means responsive to said edge detections for synchronizing said oscillator,
 (e) means for dividing the output of said oscillator into a first frequency signal at twice the horizontal line frequency and a second frequency signal equal to the horizontal line frequency,
 (f) means for detecting an edge of said separated vertical synchronization interval to provide a second edge detection,
 (g) a counter which counts the said second frequency signal,
 (h) means responsive to said second edge detection for resetting said counter, whereby the count of said counter represents the counts at a horizontal line rate within each field of said television signal,
 (g) means for decoding the count in said counter to provide, a first timing signal which is active at all times of said television signal, except during said vertical synchronization interval, a second timing signal which is active every other field said television signal, and a third timing signal which is active only during the last horizontal scanning interval preceding the vertical blanking interval of said television signal,
 (j) means for logically combining said three timing signals and said first and second frequency signals to develop a compression signal for comprising the vertical synchronizing interval and a small region encompassing each horizontal sync pulse of said picture portion of said television signal.

13. Apparatus as claimed in claim 12 wherein said means for generating said key signal and said false key signal comprises,
 (a) an AND gate having connected as inputs thereto said second and third timing signals and said first frequency signal to produce a pulse output occurring once per frame at a location approximately one half the horizontal line period following the last horizontal sync pulse preceding the vertical blanking interval and
 (b) an AND gate having connected thereto said first timing signal and said second frequency signal to produce a pulse output occurring in substantial coincidence with every horizontal sync pulse of said television signal.

14. In a scrambling apparatus of the type which scrambles a television signal according to GSS scrambling to compress sync signals and place corresponding key signals on the audio portion of the television signal, the improvement comprising; means for periodically generating a false key signal and superimposing said false key signal on said audio portion in a position trailing by approximately a half horizontal time period the key signal which corresponds to the last horizontal sync signal preceding the vertical blanking interval in such a way that said key signal and said false key signal coincide with a part of said picture portion which is outside of said vertical blanking interval.

15. A method for scrambling a television signal of the type having a picture portion and an audio portion, said picture portion including video signals and synchronization signals, said synchronization signals including horizontal sync pulses at a horizontal sync frequency and a vertical blanking interval comprising a vertical synchronizing interval followed by several horizontal sync pulses and no video signals, said vertical synchronizing interval comprising equalizing pulses followed by vertical sync pulses followed by more equalizing pulses; said method comprising the steps of:
 (a) compressing only the vertical synchronizing interval of said vertical blanking interval and compressing a small region encompassing each horizontal sync pulse of said picture portion of said TV signals to a level to render said synchronization signals undetectable by an ordinary television receiver;
(b) generating a key signal having timing pulses corresponding respectively to the timing of the horizontal sync pulses in said picture signal, including those horizontal sync pulses in said vertical blanking interval;
(c) superimposing said key signals on said audio; and
(d) transmitting said picture signal with said compressed portions and said audio with said superimposed key signal as a scrambled television signal.

16. Apparatus for scrambling a television signal of the type having a picture portion and an audio portion, said picture portion including video signals and synchronization signals, said synchronization signals including horizontal sync pulses at a horizontal sync and a vertical blanking interval comprising a vertical synchronizing interval followed by several horizontal sync pulses and no video signals, said video synchronizing interval comprising equalizing pulses followed by vertical sync pulses followed by more equalizing pulses, said apparatus comprising:
(a) means for compressing only the vertical synchronizing interval of said vertical blanking interval and compressing a small region encompassing each horizontal sync pulse of said picture portion of said TV signal to a level to render said synchronization signal undetectable by an ordinary television receiver;
(b) means for generating a key signal having timing pulses corresponding respectively to the timing of every horizontal sync pulse in said picture signal, including those horizontal sync pulses in said vertical blanking interval;
(c) means for superimposing said key signal on said audio; and
(d) means for transmitting said picture signal with said compressed portions and said audio with said superimposed key signal as a scrambled television signal.

* * * * *